Figure 1:
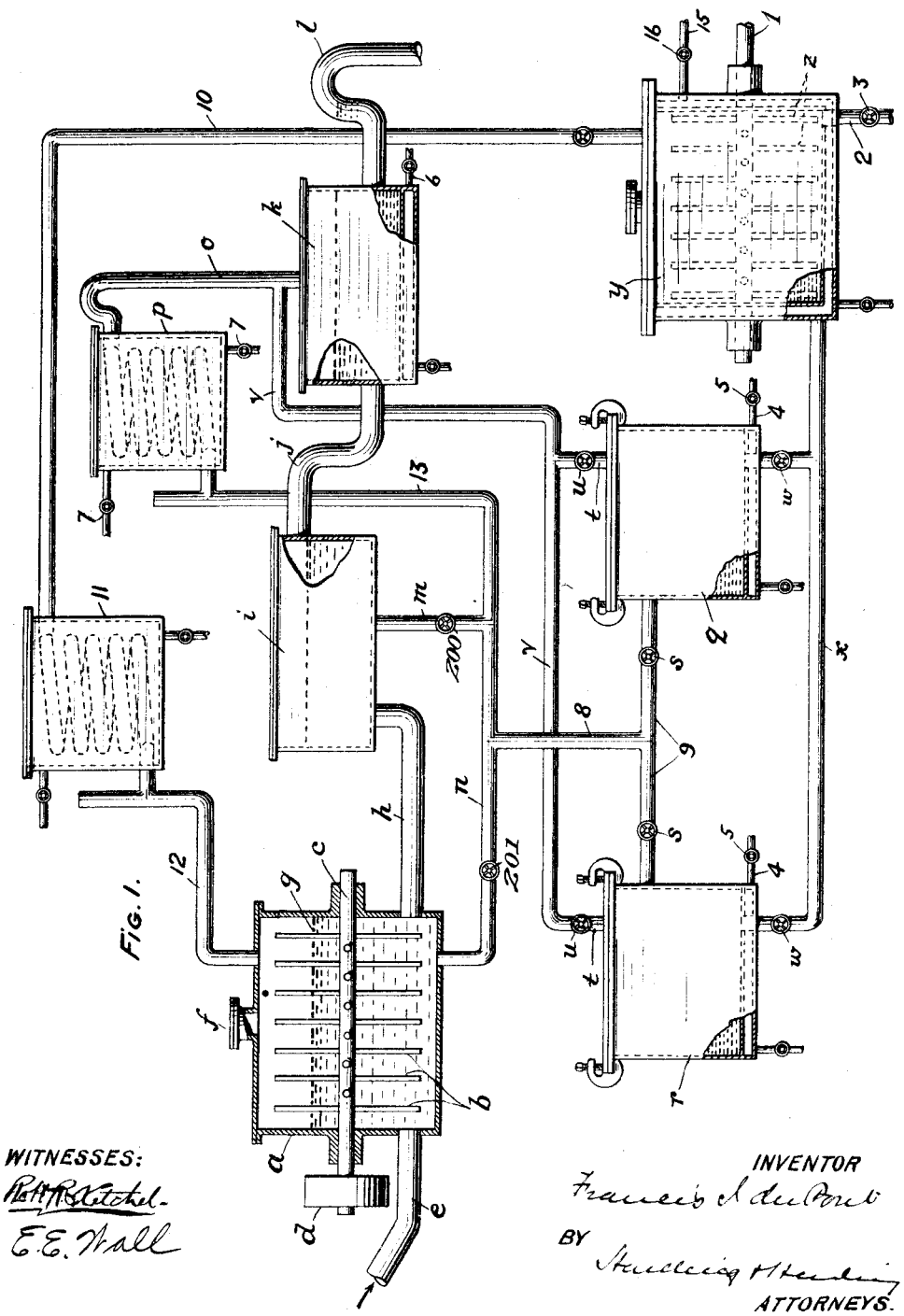

F. I. DU PONT.
PRODUCTION OF BROMIN OR BROMIDS.
APPLICATION FILED JULY 22, 1911.

1,064,460.

Patented June 10, 1913.

2 SHEETS—SHEET 2.

WITNESSES:

INVENTOR

BY

ATTORNEYS.

UNITED STATES PATENT OFFICE.

FRANCIS I. DU PONT, OF WILMINGTON, DELAWARE, ASSIGNOR TO INTERNATIONAL HALOID COMPANY, A CORPORATION OF DELAWARE.

PRODUCTION OF BROMIN OR BROMIDS.

1,064,460.

Specification of Letters Patent. Patented June 10, 1913.

Application filed July 22, 1911. Serial No. 639,872.

*To all whom it may concern:*

Be it known that I, FRANCIS I. DU PONT, a citizen of the United States, residing at Wilmington, county of Newcastle, and State of Delaware, have invented a new and useful Improvement in the Production of Bromin or Bromids, of which the following is a full, clear, and exact description, reference being had to the accompanying drawings, which form a part of this specification.

My invention relates to a method or process for the production of bromids or bromin, particularly anhydrous bromids, such as anhydrous antimony bromid. In my process this bromid or bromin is produced from an aqueous solution, for instance, brine, containing the usual small content of combined bromin.

In my process the solution, say brine, is first electrolyzed, or otherwise treated to set free the bromin. An example of the method of freeing bromin from the brine reference may be had to Reissue United States Patent No. 11,232, issued to H. H. Dow, April 12, 1892. In my process I add to such solution, say brine, a bromin extracting reagent, for instance, carbon tetra chlorid, and agitate such reagent in the brine. This causes the carbon tetra chlorid and the brine to be violently emulsified. The bromin, or a certain part of it from the brine, is extracted by the bromin extracting reagent, for instance, carbon tetra chlorid, and remains with this carbon tetra chlorid. The emulsion is then separated in a vessel, which allows the carbon tetra chlorid with its carried bromin, to fall to the bottom of the vessel from which it can be readily delivered.

The carbon tetra chlorid, with its bromin content, if not of the desired strength, may be conveyed back to the original brine solution, or if it is of the desired strength, carrying a sufficient amount of bromin for further action, it may be passed into a vessel which carries a medium which will absorb the water. This leaves the solution of bromin, and the bromin extracting reagent, carbon tetra chlorid, substantially free from water. The water extracting medium, for instance, calcium chlorid, may be revivified by removing it from the vessel and extracting the water. Before removing this medium from the vessel, or extracting the water, the vessel should be subjected to heat sufficient to vaporize any carbon tetra chlorid absorbed by the medium, which is then condensed and returned to the original brine solution.

The carbon tetra chlorid containing in solution the bromin, and from which the water has been removed, is passed into a vessel where it is agitated in the presence of the element desired to combine with the bromin, for instance, powdered metallic antimony, if it is desired to use the process to make antimony bromid. The rotation of the agitators in the vessel causes the combining element, for instance antimony, to combine with the bromin dissolved in the carbon tetra chlorid, and bromid of antimony is formed. This vessel is then subjected to heat, which vaporizes the carbon tetra chlorid, which may be condensed and removed and returned to the tank. After the antimony has been converted into antimony bromid, the agitation is stopped, and the bromid of antimony falls to the bottom of the vessel from which it may be removed. The brine remaining in the first mentioned agitating vessel in which the carbon tetra chlorid with the carried bromin was separated, is passed into a second vessel which is heated, and which drives off the bromin extracting agent and any carried bromin. This may be condensed, and if weak, returned to the original brine solution, or if strong enough, may be carried to the vessel in which the calcium chlorid is used, and from this is passed to the agitating vessel in which it is combined with the antimony. The brine remaining after the action in the last mentioned vessel from which the carbon tetra chlorid with carried bromin is removed from the brine by heating, overflows, and may be allowed to go to waste, or, if it still contains sufficient bromin, it may be returned to the original brine solution.

If it is desired to use the process in the production of bromin, then the vessel in which the antimony or other combining elements is added to bromin is not used, nor is this combining step used in the process. There is no particular advantage when the process is being used to produce bromin in desiccating the carbon tetra chlorid solution of bromin. Therefore, in such cases, the vessels in which calcium chlorid is used can be dispensed with.

The carbon tetra chlorid solution carrying the bromin which has been extracted, is subjected to a fractional distillation whereby the bromin is separated therefrom, this being possible because the boiling point of the carbon tetra chlorid is 76.7 and that of the bromin 63°.

In general my process consists in extracting the bromin from the brine or other aqueous solutions, which contain the bromin in a free condition by means of a liquid insoluble or substantially insoluble in the aqueous solution and having a greater avidity for bromin than said solution. It also consists in doing this with the intermediate step of separating the extracting liquid by gravity from the aqueous solution. Further, it may include the step of drying or freeing from water the bromin when in solution in the extracting liquid. Finally, it consists in causing the bromin to act upon a metal or other substance of which it is desired to produce a bromid while still in solution in the extracting liquid.

I will now describe an apparatus by which my invention may be carried out.

Figure 2:
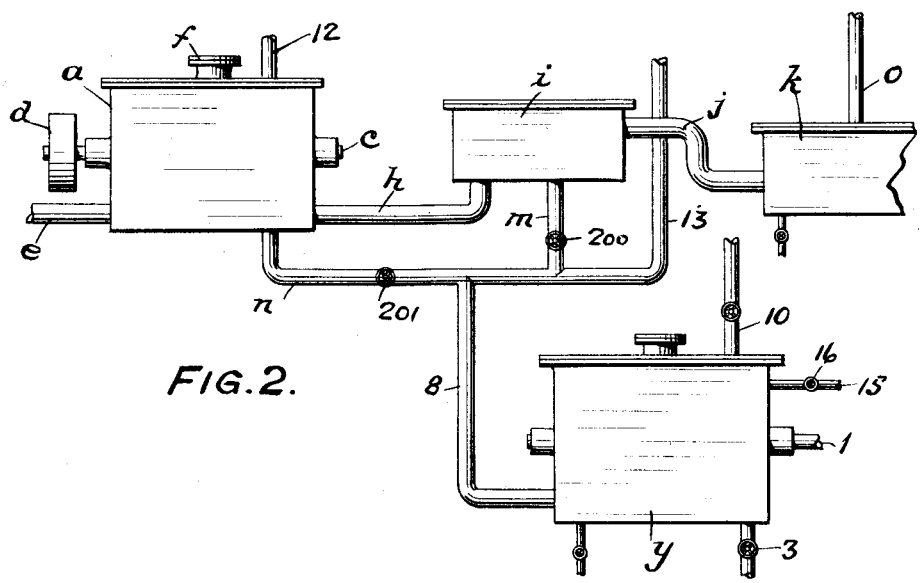
Figure 3:
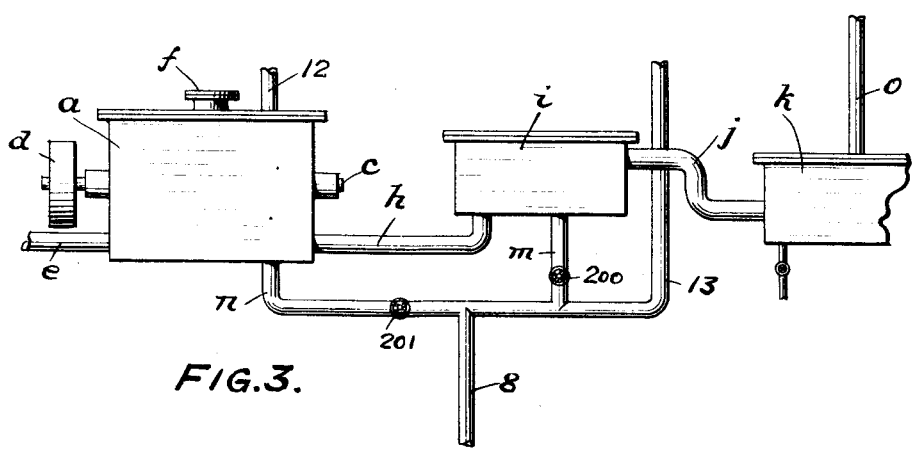

Figure 1 represents a general view of an apparatus for carrying out my invention. Fig. 2 shows another form of apparatus for carrying out my invention. Fig. 3 shows another general view of an apparatus for carrying out my invention.

$a$ is a vessel containing the agitators $b$ connected to the shaft $c$, which shaft $c$ is rotated by pulley $d$.

$e$ is the inlet pipe for the brine which has previously been treated to produce bromin in a free condition, and $f$ is an inlet for the bromin extracting liquid, which may be, for instance, carbon tetra chlorid.

$g$ represents the level of the brine.

From the vessel $a$ a pipe $h$ passes to a separator $i$, and from the upper portion of the separator $i$ a pipe $j$ passes to the steam jacketed vessel $k$, which vessel has the trap outlet $l$.

$m$ is a pipe leading from the lower portion of vessel $i$ and entering into pipe $n$. This pipe $m$ has the valve 200. On the top of the steam jacketed vessel $k$ a pipe $o$ leads to the condenser $p$ and from the condenser $p$ a pipe 13 leads to the pipe $n$. The pipe $n$ terminates in the vessel $a$. The pipe $n$ has the valve 201. It has the branch pipe 8 terminating in the pipe 9, the ends of which pipe 9 enter respectively the steam jacketed vessels $q$ and $r$. On the pipe 9 are the valves $s$. From the top of these vessels $q$ and $r$ are pipes $t$, having valves $u$, which connect with the pipe $v$, which pipe $v$ terminates in the pipe $o$. The lower portion of the vessels $q$ and $r$ have outlets controlled by the valves $w$, connecting with the pipe $x$ which extends to the jacketed vessel $y$, having the agitators $z$ on the shaft 1. 2 is an outlet from vessel $y$ controlled by valve 3 and 15 is a steam pipe for the jacket of vessel $y$ controlled by the valve 16.

4 are steam pipes for the vessels $q$ and $r$, controlled by the valves 5.

6 is a valve control for the jacket of the vessel $k$, and 7 are the valves controlling condenser $p$.

In operation the brine is pumped through the pipe $e$ into the vessel $a$ and the agitators operated. The bromin extracting reagent, say carbon tetra chlorid, is initially admitted through the inlet $f$. By the operation of the agitators an emulsion is formed in the vessel $a$ in which emulsion the carbon tetra chlorid carries the bromin. The brine solution with the carbon tetra chlorid carrying the bromin passes into the separator $i$ where a large part of the carbon tetra chlorid with the carried bromin drops to the bottom. If the last mentioned solution is of sufficient bromin strength to enable a substantial extraction of the bromin, the valves $s$ are open so as to allow the carbon tetra chlorid carrying the bromin to pass into the vessels $r$ and $q$ which contain calcium chlorid or other water absorbing medium. After the water has been absorbed by the calcium chlorid, the carbon tetra chlorid carrying the bromin passes into the vessel $y$ where it is agitated in the presence of antimony. After the antimony is combined with the bromin, it will form antimony bromid and drop to the bottom and may be removed by opening the valve 3. Sufficient heat is applied to the jacket of this vessel to cause the carbon tetra chlorid to be vaporized, and it passes through the pipe 10 to condenser 11, from which it passes back again into the tank $a$ through the pipe 12.

If the carbon tetra chlorid produced with the bromin is not rich enough in bromin, to enable a substantial extraction of bromin the valves $s$ are closed, which causes this material to return to the original brine solution near the bottom of the tank $a$. The brine, which is at the upper portion of the tank $i$ passes through the pipe to the vessel $k$, where it is subjected to heat which drives off the carbon tetra chlorid and its carried bromin, which is condensed in the condenser $p$ and passes back through the pipe 13, and if the valves $s$ are open, it passes to the vessels $q$ and $r$, and if the valves $s$ are closed it passes back through the pipe $n$ to the vessel $a$.

If it is desired to manufacture a bromid which is not injured by water, the vessels $q$ and $r$ are not used and the pipe 8 carried directly to the vessel $y$. The pipe 8 is then provided with a stop cock and the carbon tetra chlorid containing bromin, not however absolutely free from moisture, is allowed to enter the vessel $y$ in whatever quantity desired, wherein is the metal, or base, for instance, antimony of which it is desired to produce a bromid. If it is desired to merely extract bromin, neither the vessels $q$ nor $r$ nor the vessel $y$ are used, but the carbon tetra chlorid carrying the bromin is conducted from the pipe 8 to an appropriate fractional distillation apparatus (not shown), such as is ordinarily used for the separation of liquids having different boiling points. The bromin is then separated from the carbon tetra chlorid by fractional distillation and the carbon tetra chlorid returned to the system.

The covers of the vessels $r$ and $q$ are removable so that the calcium chlorid may be removed and revivified, before such removal, however, the vessel should be heated so as to vaporize any carbon tetra chlorid and bromin in the calcium chlorid which will pass up through the pipe $v$ to the condenser $p$ where it is condensed and either returned back to the vessels $q$ and $r$ for further action or to the tank $a$.

Having now fully described my invention, what I claim and desire to protect by Letters Patent is:

1. The hereinbefore described process, which consists in adding to and agitating with an aqueous solution containing uncombined bromin, a liquid substantially insoluble in the aqueous solution, and having a greater avidity for bromin than said solution, and separating the liquid containing the bromin from the aqueous layer, and agitating said bromin containing liquid with antimony.

2. The hereinbefore described process, which consists in adding to and agitating with an aqueous solution containing uncombined bromin, a liquid substantially insoluble in the aqueous solution, and having a greater avidity for bromin than said solution, and separating the liquid containing the bromin from aqueous layer, and subjecting the bromin containing liquid to a drying or water removing action and then agitating it with antimony.

3. The hereinbefore described process, which consists in adding to and agitating with an aqueous solution containing uncombined bromin, carbon tetra chlorid, and separating the carbon tetra chlorid with its dissolved bromin from the aqueous layer, and causing the bromin while still in solution in the carbon tetra chlorid to act upon antimony.

In testimony of which invention, I have hereunto set my hand, at Philadelphia, on this 21st day of July, 1911.

FRANCIS I. du PONT.

Witnesses:
M. M. HAMILTON,
E. E. WALL.